(12) United States Patent
Schubert et al.

(10) Patent No.: US 8,347,014 B2
(45) Date of Patent: Jan. 1, 2013

(54) CLASS-BASED COMPATIBILITY TESTING AND NOTIFICATION

(75) Inventors: Emily Clark Schubert, San Jose, CA (US); Stephen Chick, Mountain View, CA (US); Scott Krueger, San Francisco, CA (US); Gregory R. Joswiak, Halfmoon Bay, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 12/895,229

(22) Filed: Sep. 30, 2010

(65) Prior Publication Data
US 2011/0302347 A1   Dec. 8, 2011

Related U.S. Application Data

(60) Provisional application No. 61/351,784, filed on Jun. 4, 2010.

(51) Int. Cl.
*G06F 13/14* (2006.01)
*G06F 13/42* (2006.01)

(52) U.S. Cl. ............ 710/305; 710/64; 710/73; 710/200; 710/303; 455/557; 726/34

(58) Field of Classification Search .................. 710/303
See application file for complete search history.

(56) References Cited

U.S. PATENT DOCUMENTS

| | | | |
|---|---|---|---|
| 5,781,744 A * | 7/1998 | Johnson et al. ............... | 710/304 |
| 5,859,522 A | 1/1999 | Theobald | |
| 5,905,859 A | 5/1999 | Holloway | |
| 5,943,021 A | 8/1999 | Hayes et al. | |
| 5,964,847 A | 10/1999 | Booth, III et al. | |
| 6,012,105 A | 1/2000 | Rubbmark et al. | |
| 6,164,547 A | 12/2000 | Vapaakoski et al. | |
| 6,169,888 B1 | 1/2001 | Lindenmeier et al. | |
| 6,453,371 B1 | 9/2002 | Hampson et al. | |
| 6,523,124 B1 * | 2/2003 | Lunsford et al. ............... | 713/320 |
| 6,665,803 B2 * | 12/2003 | Lunsford et al. ............... | 713/320 |
| 6,725,061 B1 | 4/2004 | Hutchison et al. | |
| 6,931,456 B2 | 8/2005 | Payne et al. | |
| 7,050,783 B2 * | 5/2006 | Curtiss et al. ............... | 455/404.1 |
| 7,062,261 B2 | 6/2006 | Goldstein et al. | |
| 7,127,678 B2 | 10/2006 | Bhesania et al. | |
| 7,187,947 B1 * | 3/2007 | White et al. ............... | 455/556.1 |
| 7,293,122 B1 * | 11/2007 | Schubert et al. ............... | 710/62 |
| 7,305,254 B2 | 12/2007 | Findikli | |
| 7,415,563 B1 * | 8/2008 | Holden et al. ............... | 710/305 |
| 7,441,062 B2 | 10/2008 | Novotney et al. | |
| 7,529,871 B1 * | 5/2009 | Schubert et al. ............... | 710/105 |

(Continued)

FOREIGN PATENT DOCUMENTS

EP     2230605 A1 *   9/2010

(Continued)

*Primary Examiner* — Ryan Stiglic
(74) *Attorney, Agent, or Firm* — Kilpatrick Townsend & Stockton (57) ABSTRACT

A mobile computing device (MCD) can determine, based on model-specific test result information, whether an accessory may be incompatible with specific MCD functions. In some embodiments, the accessory provides test result information separately indicating a test result for each of a number of MCD models. Multiple MCD models can be grouped into a device class, and the MCD can deem the accessory compatible if he received test result information indicates a pass result for at least one of the device models associated with a device class to which the MCD belongs. If the accessory is not deemed to be compatible with the mobile computing device, the MCD can generate a warning.

23 Claims, 6 Drawing Sheets

U.S. PATENT DOCUMENTS

| | | |
|---|---|---|
| 7,529,872 B1 | 5/2009 | Schubert et al. |
| 7,673,020 B2 | 3/2010 | Rosenbloom et al. |
| 7,823,214 B2 | 10/2010 | Rubinstein et al. |
| 8,000,820 B2 * | 8/2011 | Griffin, Jr. .................. 700/94 |
| 8,010,728 B1 * | 8/2011 | Grady et al. ................ 710/303 |
| 8,095,716 B2 * | 1/2012 | Holden et al. ............... 710/305 |
| 8,161,567 B2 * | 4/2012 | Rubinstein et al. .......... 726/34 |
| 8,165,633 B2 * | 4/2012 | Chang et al. ................ 455/557 |
| 8,238,971 B2 * | 8/2012 | Terlizzi ........................ 455/557 |
| 2001/0055978 A1 | 12/2001 | Herrod et al. |
| 2003/0220988 A1 | 11/2003 | Hymel |
| 2004/0028003 A1 | 2/2004 | Diener et al. |
| 2004/0103223 A1 | 5/2004 | Gabehart et al. |
| 2004/0150944 A1 * | 8/2004 | Byrne et al. ................ 361/683 |
| 2005/0014531 A1 | 1/2005 | Findikli |
| 2005/0022212 A1 * | 1/2005 | Bowen ........................ 719/321 |
| 2005/0239434 A1 * | 10/2005 | Marlowe ..................... 455/345 |
| 2006/0156415 A1 * | 7/2006 | Rubinstein et al. .......... 726/27 |
| 2006/0234781 A1 * | 10/2006 | Bosch ........................ 455/569.2 |
| 2007/0038434 A1 * | 2/2007 | Cvetko ......................... 703/23 |
| 2007/0099592 A1 * | 5/2007 | Thome et al. ............... 455/348 |
| 2007/0099593 A1 * | 5/2007 | Thome et al. ............... 455/349 |
| 2007/0123207 A1 * | 5/2007 | Terlizzi ........................ 455/403 |
| 2007/0135092 A1 | 6/2007 | Pieronek et al. |
| 2007/0226497 A1 | 9/2007 | Taylor |
| 2007/0248328 A1 | 10/2007 | Khan et al. |
| 2007/0271387 A1 * | 11/2007 | Lydon et al. ................ 709/230 |
| 2007/0298717 A1 | 12/2007 | Palin et al. |
| 2008/0089658 A1 * | 4/2008 | Grady et al. ................. 386/46 |
| 2008/0089667 A1 * | 4/2008 | Grady et al. ................. 386/96 |
| 2008/0092200 A1 * | 4/2008 | Grady et al. ................ 725/133 |
| 2008/0138028 A1 * | 6/2008 | Grady et al. ................... 386/1 |
| 2008/0246850 A1 * | 10/2008 | Marlowe ................... 348/222.1 |
| 2008/0320190 A1 | 12/2008 | Lydon et al. |
| 2009/0083834 A1 | 3/2009 | Rubinstein et al. |
| 2009/0132076 A1 | 5/2009 | Holden et al. |
| 2010/0009631 A1 * | 1/2010 | Griffin, Jr. ................... 455/41.2 |
| 2010/0075604 A1 * | 3/2010 | Lydon et al. ................ 455/41.3 |
| 2010/0180063 A1 * | 7/2010 | Ananny et al. .............. 710/315 |
| 2010/0233961 A1 * | 9/2010 | Holden et al. .............. 455/41.3 |
| 2010/0234068 A1 * | 9/2010 | Bolton et al. ................ 455/557 |
| 2010/0235546 A1 * | 9/2010 | Terlizzi et al. ............... 710/16 |
| 2010/0235550 A1 * | 9/2010 | Bolton et al. ................ 710/62 |
| 2010/0235552 A1 * | 9/2010 | Holden et al. ............... 710/72 |
| 2011/0099316 A1 * | 4/2011 | Tseng et al. ................. 710/304 |
| 2011/0125601 A1 * | 5/2011 | Carpenter et al. ........... 705/26.1 |
| 2011/0126005 A1 * | 5/2011 | Carpenter et al. ........... 713/158 |
| 2011/0302167 A1 * | 12/2011 | Vailaya et al. .............. 707/737 |

FOREIGN PATENT DOCUMENTS

JP        2004-242006 A        8/2004

* cited by examiner

| COMMAND | DIRECTION | PAYLOAD |
| --- | --- | --- |
| RequestTestResults | M → A | n/a |
| SendTestResults | A → M | Test Result mask, Waiver mask |

CLASS-BASED COMPATIBILITY TESTING AND NOTIFICATION

CROSS-REFERENCE TO RELATED APPLICATIONS

This application claims the benefit of U.S. Provisional Application No. 61/351,784, filed Jun. 4, 2010, entitled "Class-Based Compatibility Testing and Notification," the disclosure of which is incorporated by reference herein in its entirety.

BACKGROUND

The present disclosure relates in general to determining compatibility between electronic devices and in particular to compatibility testing and determination based on classes of devices.

In recent years, a number of mobile computing devices (MCDs) have been developed. Examples of MCDs include portable media players, mobile phones, personal digital assistants (PDAs), tablet computers, portable e-mail devices, video game players, portable navigation units relying on Global Positioning System (GPS) satellite data, and multi-function devices that can integrate numerous functions such as media storage and playback, mobile phone, Internet access, e-mail, personal information management, game play, GPS/navigation capability, and the like. Examples of MCDs include various iPhone®, iPod®, and iPad™ models manufactured and sold by Apple Inc., assignee of the present application, as well as other portable electronic devices made and sold by other manufactures and distributors under their respective brand names.

MCDs are frequently docked with other electronic devices, referred to herein as "accessories." For example, from time to time, a user may dock an MCD with a personal computer to synchronize media content and/or metadata, personal data, and the like. A user may at other times dock the same MCD with other electronic devices, such as an in-vehicle media system, a speaker dock, or the like. The user may also dock the MCD with a charger that provides power to the MCD but does not include other data or information sharing capability.

SUMMARY

Certain embodiments of the present invention provide mechanisms for determining whether a particular accessory may cause interference or other compatibility problems when connected to a particular MCD. In some embodiments, the universe of MCD models (or types) to which an accessory is connectable can be segmented into a number of device classes, with each class including one or more models. MCD models in the same device class have similar operating characteristics such that it can be assumed that an accessory that does not interfere with operation of one MCD model within a given device class will not interfere with any MCD model within that class. An accessory can be tested (or untested) with representative MCD models from any or all of the device classes. Test result data, e.g., an indication of whether testing was passed or not passed for various MCD models, can be stored in the accessory. When the accessory connects to an MCD, the accessory can provide its test result data to the MCD. The MCD can use that data in combination with its own device class to determine whether the accessory has established that it does not cause interference. If the MCD determines that interference is possible, the MCD can provide warning information to a user, e.g., by displaying a notification message on its display and/or making the warning information available through an accessory information screen.

In some embodiments, an MCD receives test result information from the accessory, e.g., when the accessory becomes connected to the MCD. The test result information can indicate a test result for each device model. The MCD can determine whether the accessory is deemed to be compatible with the mobile computing device, based at least in part on whether the received test result information indicates a pass result for at least one of the device models associated with a device class to which the MCD belongs. If the accessory is not deemed to be compatible with the mobile computing device, the MCD can provide warning information to a user and possibly disable an incompatible function. In some embodiments, the user may be prompted to choose whether to disable the function.

In some embodiments, the MCD can also receive waiver information from the accessory. The waiver information can indicate whether testing was waived for one or more of the predefined device classes. If testing was waived for at least one of the device models associated with the target device class, the accessory can be treated as compatible (e.g., no alert or other warning generated), even if the accessory did not pass the compatibility test for any MCD model associated with the device class to which the MCD belongs.

The following detailed description together with the accompanying drawings will provide a better understanding of the nature and advantages of the present invention.

DETAILED DESCRIPTION

Some accessories can interfere with operations of a mobile communication device (MCD). For example, some accessories may generate electromagnetic fields that can interfere with radio frequency (RF) signals sent or received by the MCD. This interference can make it difficult or impossible to use certain MCD functions (e.g., placing or receiving telephone calls, accessing the Internet) while the interfering accessory is connected. Whether interference will occur is generally dependent in part on factors such as proximity of the accessory to the MCD, the particular shape or position of the MCD's antenna, form factor of the accessory and/or MCD, and so on. Thus, an accessory that interferes with one model of MCD might or might not interfere with a different model, even models made by the same manufacturer or different generations of the same product.

Certain embodiments of the present invention provide mechanisms for determining whether a particular accessory may cause interference or other compatibility problems when connected to a particular MCD. In some embodiments, the universe of MCD models (or types) to which an accessory is connectable can be segmented into a number of device classes, with each class including one or more models. MCD models in the same device class have similar operating characteristics such that it can be assumed that an accessory that does not interfere with operation of one MCD model within a given device class will not interfere with any MCD model within that class. An accessory can be tested (or untested) with representative MCD models from any or all of the device classes. Test result data, e.g., an indication of whether testing was passed or not passed for various MCD models, can be stored in or otherwise accessible to the accessory. When the accessory connects to an MCD, the accessory can provide its test result data to the MCD. The MCD can use that data in combination with its own device class to determine whether the accessory has established that it does not cause interference. If the MCD determines that interference is possible, the MCD can provide warning information to a user, e.g., by displaying a notification message on its display or by making warning information available in an accessory information screen that the user can choose to view.

Figure 1:
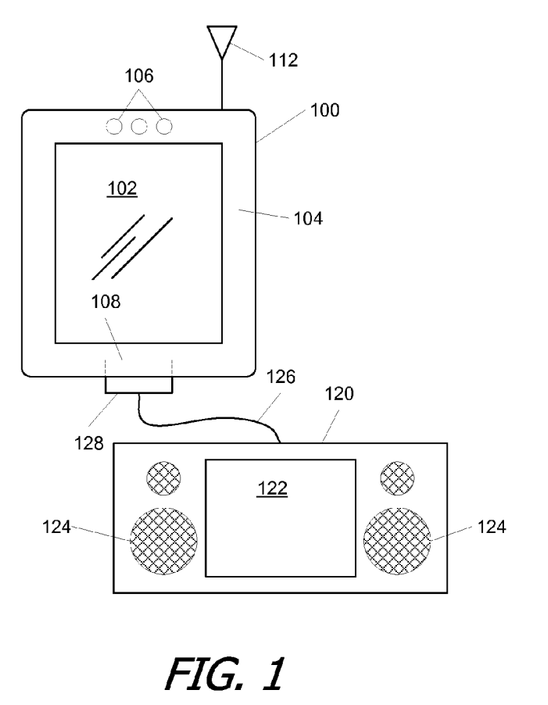
FIG. 1 is a front view of a mobile computing device (MCD) connected to an accessory according to an embodiment of the present invention.

FIG. 1 is a front view of a mobile computing device (MCD) 100 connected to an accessory 120 according to an embodiment of the present invention. MCD 100 can have a touchscreen display 102 surrounded by bezel 104. Control buttons 106 are provided in bezel 104 and can be used, e.g., to wake MCD 100 from a hibernation state, to put MCD 100 into a hibernation state, or the like.

MCD 100 can have a connector 108 recessed into a bottom surface thereof, allowing MCD 100 to dock with an accessory device. Connector 108 can include a number of pins for carrying power, analog, and digital signals between MCD 100 and a connected accessory. In one embodiment, connector 108 can be implemented as a 30-pin docking connector as used in existing iPod® and iPhone° products sold by Apple Inc., assignee of the present application; in this embodiment, connector 108 is recessed into the housing of MCD 100 and is referred to as a "receptacle" connector. Other connectors can also be used.

MCD 100 can also have a wireless network interface, indicated by antenna 112, permitting access to a voice and/or data network. While antenna 112 is shown as external, it is to be understood that antenna 112 can be built into the housing of MCD 100. Any type of network access can be supported, and MCD 100 can provide wired network interfaces (e.g., Ethernet) in addition to or instead of a wireless interface.

In the embodiment shown, MCD 100 can be a tablet computer with, e.g., a 10-inch screen. In other embodiments, MCD 100 can have a variety of form factors and configurations, e.g., smart phone, personal digital assistant, media player, portable web browser, etc.

Accessory 120 can be any accessory capable of interoperating with MCD 100. In the example shown, accessory 120 is a video dock that provides a display screen 122 and speakers 124. Accessory 120 connects to MCD 100 via a cable 126. Cable 126 terminates in a connector 128 that mates with connector 108 of MCD 100. Cable 126 can incorporate various signal lines to provide transmission of control signals, audio signals, video signals, power and the like between MCD 100 and accessory 120. Thus, for example, MCD 100 can generate analog or digital video signals (including images and audio) and transmit the signals to accessory 120 via cable 126. In some embodiments, accessory 120 may include a control panel (not shown) or remote control (also not shown) and can send control signals to MCD 100 in response to operation of the controls. Thus, a user can control operations of MCD 100 by interacting with accessory 120.

Accessory 120 can have any form factor desired. For example, a video dock may provide a significantly larger screen than MCD 100, allowing several users to watch a movie or the like together.

In some instances, operation of accessory 120 may adversely affect, or interfere with, other (possibly unrelated) operations of MCD 100. For example, accessory 120 generally includes electronic components that can generate electromagnetic fields. In some embodiments, these fields may interfere with the radio-frequency (RF) activity of antenna 112, reducing the signal strength for transmission and/or reception at MCD 100. This can result in unreliable network connections, dropped phone calls, or the like. Accordingly, it is desirable in some embodiments to be able to advise (or warn) a user of possible accessory interference, e.g., by presenting a notification in a pop-up on a display of MCD 100 and/or by providing warning information indicating the potential problem in an accessory-information screen that the user can select and view.

RF interference can occur in various forms, including TDMA (time division multiplexed access) noise and over-the-air (also referred to herein as "OTA" or "desense") interference from other broadcast signals. TDMA noise can result in an increased bit error rate, affecting the ability of MCD 100 to communicate with a TDMA-based communication network such as many existing cellular voice networks or data networks. OTA interference, which can be caused by accessory 120, can reduce the signal strength at antenna 112, which in turn can also result in increased bit error rate and/or dropped connections. Other types of interference may also occur. For example, passive antenna de-tuning can occur if pieces of conductive material are placed near an antenna and can significantly reduce signal sensitivity in the antenna. In addition, in some instances RF interference from MCD 100 can negatively affect accessory performance. For example, RF emissions from MCD 100 can get into audio processing circuitry of accessory 120 and create noise (e.g., TDMA "chopper" noise) in speakers 124.

It may be desirable to provide warning information in the form of an alert when the presence of an accessory increases the risk of RF interference, as the user may wish to disable RF communications or disconnect the accessory if RF communication is a higher priority for the user at that time. It may also be desirable to provide warning information in a form such as an accessory-information screen that a user can choose to view or not. For example, if the user notices problems while operating MCD 100 and accessory 120, the user can view the information screen and see information about the compatibility test results; this information can help the user diagnose problems, etc.

Figure 2:
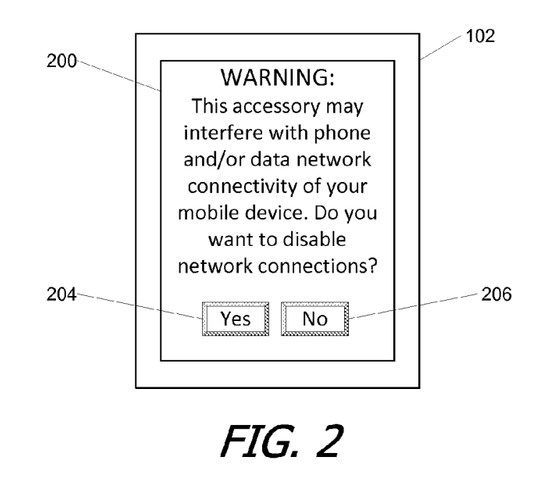
FIG. 2 is a screenshot illustrating an alert message that can be displayed on a display screen of an MCD.

One possible approach is for the accessory developer (e.g., designer, manufacturer) to test accessory 120 to determine whether accessory 120 causes RF interference with MCD 100 (or vice versa). A compatibility test can determine whether the RF interference caused by accessory 120 is below a maximum acceptable level; the test and acceptable interference levels can be specified by the MCD manufacturer so that all accessories are tested against the same standard. The test is said to be "passed" if RF interference is below the maximum level and "failed" otherwise. Either accessory 120 or MCD 100 can store information about the test result (e.g., a pass/fail indicator or actual test result data such as a percentage degradation in signal strength) for a particular accessory. If, when accessory 120 connects, MCD 100 cannot verify that accessory 120 has passed the test (either because no result information is available or because the result information indicates failure), MCD 100 can provide warning information to the user that there is a risk of RF interference. In some embodiments, warning information can be presented in a pop-up alert message or notification. For example, FIG. 2 is a screenshot illustrating an alert message 200 that can be displayed on display 102 of MCD 100 (FIG. 1). In this example, message 200 provides soft buttons 204, 206 that allow the user to choose whether to disable RF communication. Other alerts, including visual and/or audio alerts, vibration alerts, etc., can also be used. In some embodiments, in addition to or instead of an immediate alert, MCD 100 can provide warning information via an accessory information screen that can be displayed in response to a user request; an example of such a screen is described below with reference to FIG. 11.

This approach may be unsatisfying in the case where accessory 120 is designed to interoperate with a variety of MCDs. For example, an MCD manufacturer may make various models of mobile telephone handsets, smart phones, and tablet computers that all provide a common interface to accessories so that a given accessory can interoperate with any MCD model. The various MCD models, however, have different form factors, different material compositions (e.g., ceramic, glass, metal, or plastic components), and different antenna designs, all of which can affect RF interference characteristics. For example, OTA interference varies significantly depending on the form factor of the MCD, while TDMA noise is relatively insensitive to MCD form factor. Accordingly, a single test result obtained from one MCD model may not be indicative of the level of RF interference when the accessory is connected to a different MCD model.

In some embodiments of the present invention, accessory 120 can be tested with a number of different MCD models, with results being determined and stored in accessory 120 on a per-model basis. When accessory 120 connects to a particular MCD 100, accessory 120 can report its test result information to MCD 100, and MCD 100 can use the test result information, as well its own model, determine whether RF interference is a concern. MCD 100 can then determine whether to provide information to the user (and in what form).

Figure 3:
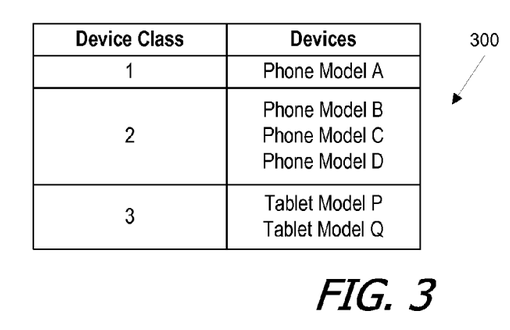
FIG. 3 is a table illustrating device classes according to an embodiment of the present invention.

In some embodiments, MCD models can be grouped into "device classes," where devices in the same class have similar RF properties. Thus, for example, different models of a smart phone might have similar form factors and antenna characteristics, so that results from testing one model can be expected to apply to another model. FIG. 3 is a table 300 illustrating device classes according to an embodiment of the present invention. Each class can be assigned a label (in this example, numeric identifiers 1, 2, 3), and different devices can be assigned to different classes. For example, a smart phone model A is assigned to class 1; smart phone models B, C, D are assigned to class 2; and tablet models P and Q are assigned to class 3. These assignments can be made based on form factors, arrangement of antenna and other internal components, and/or material composition (e.g., which portions of the device are glass, ceramic, metal, or plastic). Assignments can also be made based on direct study of RF characteristics of different MCD models; models with similar characteristics can be grouped into a single class. When a new MCD model is created, the new model can be added to an existing device class or assigned to a new device class, depending on its RF characteristics. Any number of models can be in a given device class, and any number of device classes can be provided.

A given accessory model can be tested with one MCD model per device class, with the result being taken as representative of the class. Thus, when accessory 120 reports its per-model test results to MCD 100, MCD 100 can determine, based on its own device class, whether accessory 120 passed RF interference testing for any model in the same device class as MCD 100. Thus, accessory 120 does not have to be tested with every MCD model. For example, if a new MCD model is developed after accessory 120 is manufactured, accessory 120 will be deemed to be compatible (e.g., not causing RF interference) with the new model as long as the new model is in the same device class as an older model for which accessory 120 passed the testing. Where MCD 120 is configured to display an alert message only when an accessory has not passed the RF interference testing for any MCD model within the same device class as MCD 100 itself, relying on device classes rather than just models can reduce the number of false alerts.

It will be appreciated that the system described herein is illustrative and that variations and modifications are possible. The MCDs and accessories may have different form factors, components, and/or functionalities from those described herein. An accessory can be configured to interoperate with a variety of MCD models, and it is not necessary that all accessories interoperate with all MCD models of a given manufacturer.

In some embodiments, compatibility testing can be waived by the MCD manufacturer for certain accessories or for certain combinations of accessories and MCD models. For example, an accessory can be a Secure Digital (SD) card reader or the like. Such card readers can cause significant RF interference while actively reading from or writing to a card, but reading and writing are generally transitory operations that do not cause ongoing interference. In such a case, it can be desirable to waive RF interference testing and identify the accessory as non-interfering. Some embodiments make it possible for an MCD to distinguish between the case where the accessory passed the compatibility test and the case where the test was waived. This information can be useful, e.g., for diagnostics, troubleshooting, or the like.

Examples of systems and processes for communicating compatibility test result information and determining whether to provide warning information to a user will now be described. While specific examples may make reference to RF interference testing, it is to be understood that similar systems and processes could be applied for any other type of compatibility testing to provide model-specific warnings regarding potential incompatibility or performance issues.

Figure 4:
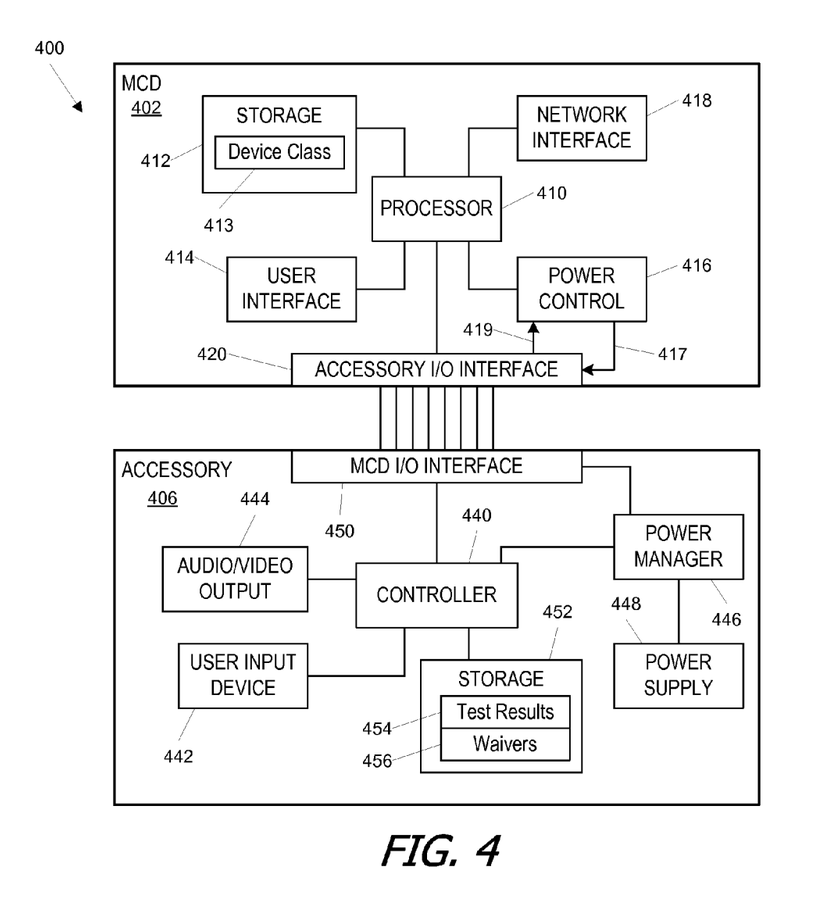
FIG. 4 is a simplified block diagram of a system including an MCD and an accessory according to an embodiment of the present invention.

FIG. 4 is a simplified block diagram of a system 400 including MCD 402 and accessory 406 according to an embodiment of the present invention. In this embodiment, MCD 402 (e.g., implementing MCD 100 of FIG. 1) can provide computing, communication and/or media playback capability. MCD 402 can include processor 410, storage device 412, user interface 414, power manager 416, network interface 418, and accessory input/output (I/O) interface 420. MCD 402 can also include other components (not explicitly shown) to provide various enhanced capabilities.

Storage device 412 can be implemented, e.g., using disk, flash memory, or any other non-volatile storage medium. In some embodiments, storage device 412 can store media assets such as audio, video, still images, or the like, that can be played by MCD 402. Storage device 412 can also store other information such as a user's contacts (names, addresses, phone numbers, etc.); scheduled appointments and events; notes; and/or other personal information. In some embodiments, storage device 412 can store one or more application programs to be executed by processor 410 (e.g., video game programs, personal information management programs, media playback programs, etc.).

In some embodiments, storage device 412 can store device class information 413 for MCD 402. Device class information 413 can include, e.g., a device class identifier for the class to which MCD 402 belongs and/or information as to which other MCD models are associated with the same device class as MCD 402. In some embodiments, accessory 406 reports its test results in the form of a bit mask with different bits corresponding to different MCD models, and device class information 413 can include identifiers of bits in the bit mask that correspond to models in the device class of MCD 402.

User interface 414 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 414 to invoke the functionality of MCD 402 and can view and/or hear output from MCD 402 via output devices of user interface 414.

Processor 410, which can be implemented as one or more integrated circuits (e.g., a conventional microprocessor or microcontroller), can control the operation of MCD 402. In various embodiments, processor 404 can execute a variety of programs in response to program code and can maintain multiple concurrently executing programs or processes. At any given time, some or all of the program code to be executed can be resident in processor 410 and/or in storage media such as storage device 412.

Through suitable programming, processor 410 can provide various functionality for MCD 402. For example, in response to user input signals provided by user interface 414, processor 410 can operate a database engine to navigate a database of media assets stored in storage device 412 in response to user input and display lists of selected assets. Processor 410 can respond to user selection of an asset (or assets) to be played by transferring asset information to a playback engine also operated by processor 410, thus allowing media content to be played. Processor 410 can also operate other programs to control other functions of MCD 402. In some embodiments, processor 410 implements a protocol daemon and other programs to manage communication with a connected accessory (e.g., accessory 406).

Power manager 416 provides power management capability for MCD 402. For example, power manager 416 can deliver power from a battery (not explicitly shown) to accessory I/O interface 420 via line 417 and to other components of MCD 402 (power connections not shown). Power manager 416 can also receive power via accessory I/O interface 420 and line 419 and deliver received power to various components of MCD 402; power received from an accessory can also be delivered to the battery, thereby allowing the battery to be recharged via accessory I/O interface 420. In some embodiments, power manager 416 can be implemented using programmable or controllable circuits operating in response to control signals generated by program code executing on processor 410 or as a separate microprocessor or microcontroller.

In some embodiments, power manager 416 is responsive to signals from a sensor (not explicitly shown) in accessory I/O interface 420. The sensor can generate a signal indicative of the type of accessory connected, and power manager 416 can use this information to determine, e.g., whether to distribute power from the battery or power received from accessory I/O interface 420. Power manager 416 can also provide other power management capabilities, such as regulating power consumption of other components of MCD 402 based on the source and amount of available power, monitoring stored power in the battery and generating user alerts if the stored power drops below a minimum level, and so on.

Network interface 418 can provide voice and/or data communication capability for MCD 402. In some embodiments network interface 418 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments network interface 418 can provide wired network connectivity (e.g., Ethernet) in addition to or instead of a wireless interface. Network interface 418 can be implemented using a combination of hardware (e.g., antennas, modulators/demodulators, encoders/decoders, and other analog and/or digital signal processing circuits) and software components.

Accessory I/O interface 420 can allow MCD 402 to communicate with various accessories. For example, accessory I/O interface 420 can support connections to a computer, an external speaker or media playback station (e.g., video dock accessory 120 of FIG. 1), a digital camera, a radio tuner (e.g., FM, AM and/or satellite), an in-vehicle entertainment system, an external video device, card reader, disc reader, or the like.

In some embodiments, accessory I/O interface 420 can include a connector, such as a 30-pin connector corresponding to the connector used on iPod® and iPhone° products, as well as supporting circuitry. The connector can provide connections for power and ground as well as for various wired communication interfaces such as Universal Serial Bus (USB), FireWire (IEEE 1394 standard), and/or universal asynchronous receiver/transmitter (UART). The connector can also provide connections for audio and/or video signals, which may be transmitted to or from MCD 402 in analog and/or digital formats. Thus, accessory I/O interface 420 can support multiple communication channels, and a given accessory can use any or all of these channels.

Accessory 406 (e.g., implementing accessory 120 of FIG. 1) can include controller 440, user input device 442, audio/video output device 444, power manager 446, power supply 448, MCD I/O interface 450, and storage device 452. Accessory 406 is representative of a broad range of accessories that can have their own functionality and be connected to MCD 402. Accessories can vary widely in capability, complexity, and form factor. Various accessories may include components not shown in FIG. 4, including but not limited to storage devices (disk, flash memory, etc.) with fixed or removable storage media; camera components such as lenses, image sensors, and controls for same (e.g., aperture, zoom, exposure time, frame rate, etc.); microphones for recording audio (either alone or in connection with video recording); and so on.

Controller 440 can include, e.g., a microprocessor or microcontroller executing program code to perform various operations associated with accessory 406. For example, where accessory 406 incorporates a sound and/or video system (e.g., as shown in FIG. 1), program code executed by controller 440 can include programs for digital audio decoding, analog or digital audio processing, and the like. Where accessory 406 incorporates a digital camera, program code executed by controller 440 can include programs that allow a user to control the camera to adjust settings, capture images, display images, transfer image data to another electronic apparatus, etc.

User input device 442 may include user-operable controls such as a touch pad, touch screen, scroll wheel, click wheel, dial, button, switch, keyboard, keypad, microphone, or the like. A user can operate the various input controls of user interface 434 to invoke functionality of accessory 406, and such functionality may include exchanging control signals, data, or other communications with MCD 402. In some embodiments, the communications sent and received by accessory 406 can be independent of whether an intermediary is present.

In some embodiments, accessory 406 can also provide output devices such as audio/video output device 444. In some embodiments, audio/video output device 444 can include speakers and/or connection ports for connecting external speakers or headphones; a video screen and/or a connection port for connecting an external video screen, indicator lights, or the like, together with supporting electronics (e.g., digital-to-analog or analog-to-digital converters, signal processors or the like). These components can be coupled to receive audio and/or video signals via MCD I/O interface 450. Such components can allow the user to view and/or hear output from accessory 406.

Power manager 446 can provide power management capability for accessory 406. For example, power manager 446 can be configured to receive power from a power supply 448. In some embodiments, power supply 448 can include a connection to an external power source (e.g., the standard electric grid); for example, power supply 448 can include an AC-DC converter that can be internal or external to accessory 406. In other embodiments, power supply 448 can include a battery or other energy storage device. Power manager 446 can deliver power from power supply 448 to various components of accessory 406. In addition, in some embodiments, power manager 446 can deliver power to upstream accessories via MCD I/O interface 450.

Storage device 452 can be implemented, e.g., using disk, flash memory, or any other non-volatile storage medium. In some embodiments, storage device 452 can store program code and/or control information for controller 440. For example, storage device 452 can store test result data 454 and/or waiver data 456. Test result data 454 can include, e.g., a bit mask with each bit corresponding to a different MCD model, and the bit having a value indicating whether a compatibility test (e.g., an RF interference test as described above) was passed (bit set to "1") or not (bit set to "0"). It should be noted that in this embodiment, the "not passed" case includes cases where the accessory was not tested with a particular MCD model as well as cases where the MCD was tested with that model and failed. Other formats can also be used to store test result data. For example, actual numerical test results, e.g., a quantitative measure of loss (or gain as the case may be) in signal strength, can be stored as test result data 454. In some embodiments, the accessory can provide a list of MCD model identifiers for which the accessory passed compatibility testing. Other forms and formats can also be used.

Waiver data 456 can be a bit mask similar to test result data 454, with a bit set to "1" if testing was waived by the MCD manufacturer for a particular model and to "0" if testing was not waived. In some embodiments, the accessory can provide a list of MCD model identifiers for which compatibility testing was waived. Other forms and formats can also be used.

MCD I/O interface 450 can allow accessory 406 to communicate with MCD 402 (or another MCD). In accordance with some embodiments of the invention, MCD I/O interface 450 can incorporate a USB interface. For example, MCD I/O interface 426 can provide a standard, mini, or micro USB port. In other embodiments, MCD I/O interface 426 can include a connector that can mate directly with a connector included in MCD 402, such as a 30-pin connector that mates with the connector used on various iPod® products. Such a connector can be used to supply power to MCD 402 or receive power from MCD 402, to receive audio and/or video signals in analog and/or digital formats, and to communicate information via various interfaces such as USB, UART, and/or FireWire.

Accessory 406 can be any electronic apparatus that interacts with MCD 402. In some embodiments, accessory 406 can provide remote control over operations of MCD 402, or a remote user interface that can include both input and output controls (e.g., a display screen). Accessory 406 in various embodiments can control any function of MCD 402 and can also receive media content from MCD 402 and present such content to the user (e.g., through audio speakers and/or video display screen, depending on the type of media content). In other embodiments, MCD 402 can control operations of accessory 406, such as retrieving stored data from a storage medium of accessory 406, initiating an image capture operation by a camera incorporated into accessory 406, etc.

It will be appreciated that the system configurations and components described herein are illustrative and that variations and modifications are possible. The MCD and/or accessory may have other capabilities not specifically described herein (e.g., mobile phone, global positioning system (GPS), broadband data communication, Internet connectivity, etc.).

Connectors at the MCD and accessory interfaces can be complementary or not as desired. Where two connectors are not complementary, an adapter can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the MCD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 420 of MCD 402 and MCD I/O interface 450 of accessory 406 allow MCD 402 to be connected with accessory 406 and subsequently disconnected from accessory 406. As used herein, an MCD and an accessory are "connected" whenever a communication channel is established between their respective mating interfaces and "disconnected" when the channel is terminated. Such connection can be achieved via direct physical connection, e.g., with mating connectors; indirect physical connection, e.g., via a cable; and/or wireless connection, e.g., via Bluetooth.

In some embodiments, an MCD and an accessory can communicate while connected by exchanging commands and data according to an MCD accessory protocol, also referred to herein as an "accessory protocol." The commands and data can be communicated, e.g., using any wired or wireless transport medium provided by the relevant interfaces.

The accessory protocol defines a format for messages to be exchanged between MCD 402 and any accessories connected thereto. For instance, the accessory protocol may specify that each message (also referred to herein as a command) is sent in a packet with a header and an optional payload. The header provides basic information (e.g., a start indicator, length of the packet, and a command code identifying a command to be processed by the recipient), while the payload provides any data associated with the command; the amount of associated data can be different for different commands, and some commands may provide for variable-length payloads. In some embodiments, the commands may be defined such that any particular command code is valid in only one direction. The packet can also include error-detection or error-correction codes as known in the art.

The accessory protocol can define a number of "lingoes," where a "lingo" is a group of related commands that can be supported (or unsupported) by various classes of accessories. In one embodiment, a command code can include a first byte identifying the lingo to which the command belongs and a second byte identifying the particular command within the lingo. Other command structures may also be used. It is not required that all accessories, or all MCDs to which an accessory can be connected, support every lingo defined within the accessory protocol.

In some embodiments, every accessory (including accessory 406) and every MCD 402 that use the accessory protocol support at least a "general" lingo that includes commands common to the MCD and all accessories. The general lingo can include commands enabling the MCD and the accessory to identify and authenticate themselves to each other and to provide general information about their respective capabilities, including which (if any) other lingoes each supports. In some embodiments, the general information provided by the accessory can include test result information, allowing the MCD to determine whether to provide warning information related to possible incompatibility or interference. The general lingo can also include authentication commands that the MCD can use to verify the purported identity and capabilities of the accessory (or vice versa), and the accessory (or MCD) may be blocked from invoking certain (or all) commands or lingoes if the authentication is unsuccessful.

An MCD accessory protocol can also include various other lingoes, such as a simple remote lingo that allows an accessory to send a command indicating a function of the MCD to be invoked, a remote user interface lingo that can be used to communicate commands and data related to replicating all or part of a user interface of an MCD on an accessory (thereby supporting a more advanced remote control), a tuner lingo that allows a user to control a tuner accessory by operating the MCD and/or to control a tuner in the MCD by operating an accessory, a storage lingo that allows an accessory to store data on the MCD, and so on. Any lingo or combination of lingoes or other commands or groups of commands can be used in connection with an accessory protocol.

Figure 5:
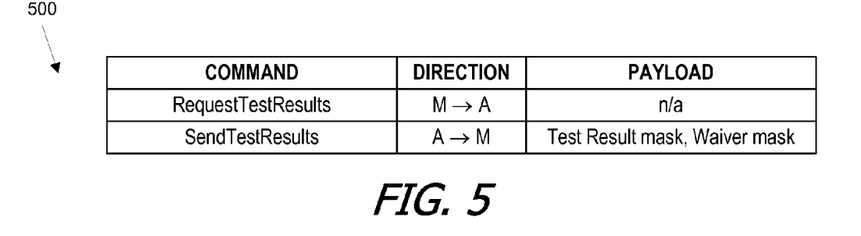
FIG. 5 is a table illustrating suitable commands according to an embodiment of the present invention.

In some embodiments, the MCD accessory protocol can include commands usable by MCD 402 to obtain test result information from accessory 406. FIG. 5 is a table 500 illustrating suitable commands according to an embodiment of the present invention. These commands can be part of the general lingo or another lingo of an accessory protocol.

A RequestTestResults command can be sent from MCD 402 to accessory 406 to request that accessory 406 send its test result data 454 and, if applicable, waiver data 456. In response, accessory 406 can send a SendTestResults command, the payload of which can include test result bit mask 454 and, if applicable, waiver bit mask 456.

In other embodiments, the test result and waiver information can be sent automatically when accessory 406 connects, e.g., as part of its general capabilities information, and a specific request from MCD 402 is not required.

Figure 6:
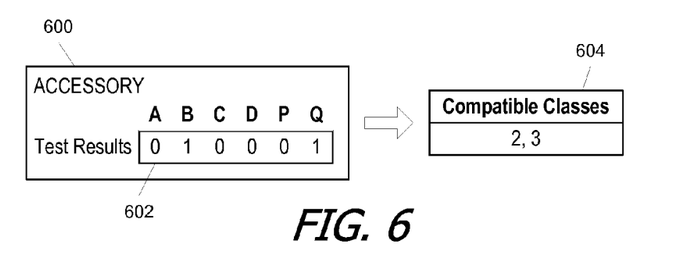
FIGS. 6-8 illustrate examples of determining compatible device classes from such bit masks according to embodiments of the present invention.
Figure 7:
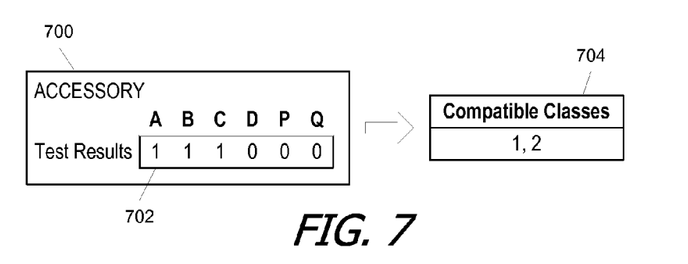
Figure 8:
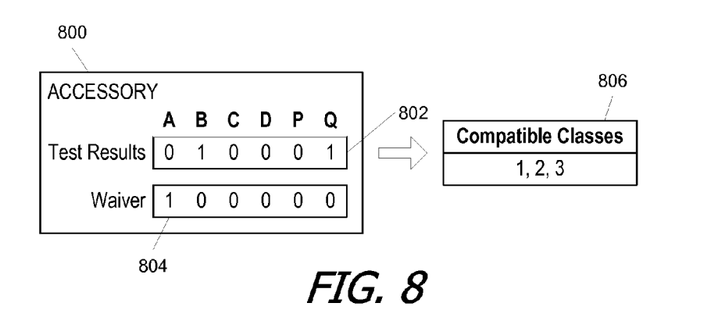

As noted above, test result information and/or waiver information can be represented in a bit mask. FIGS. 6-8 illustrate examples of determining compatible device classes from such bit masks according to embodiments of the present invention. In these examples, the device classes and MCD models are those shown in table 300 (FIG. 3), and the bit masks map to the MCD models as indicated by the letters (first bit is for phone model A, second bit for phone model B, and so on).

FIG. 6 shows an accessory 600 having a test results bit mask 602. Accessory 600 passed testing for phone model B and tablet model Q; consequently, the compatible device classes (table 604) are classes 2 (which includes phone model B) and 3 (which includes tablet model Q). Thus, if accessory 600 connects to phone model B, C or D, it would be deemed compatible as all 3 models are in device class 2. Similarly, if accessory 600 connects to tablet models P or Q (device class 3), it would be deemed compatible. However, if accessory 600 connects to phone model A (which is in device class 1), it would not be deemed compatible, and in some embodiments phone model A can provide a warning to a user when accessory 600 is connected while other MCDs (other models) do not provide warnings.

FIG. 7 shows an accessory 700 having a test results bit mask 702. Accessory 700 passed testing for phone models A, B, and C; consequently, the compatible device classes (table 704) are classes 1 (which includes phone model A) and 2 (which includes phone models B and C). Thus, if accessory 600 connects to any of phone models A, B, C or D, it would be deemed compatible as all of these phone models are in device class 1 or 2. However, if accessory 700 connects to tablet model P or Q (both of which are in device class 3), it would not be deemed compatible, and in some embodiments tablet model P or Q can provide a warning to a user when accessory 700 is connected while other MCDs (other models) do not provide warnings.

FIG. 8 shows an accessory 800 having a test results bit mask 802 and a waiver bit mask 804. Accessory 800 passed testing for phone model B and tablet model Q; in addition, testing was waived for phone model A. Consequently, the compatible device classes (table 806) are classes 1 (which includes phone model A, for which testing was waived), 2 (which includes phone model B), and 3 (which includes tablet model Q). Consequently, accessory 800 would be deemed compatible with any of phone models A, B, C or D as well as either of tablet models P or Q. In some embodiments, none of the MCD models listed in table 300 provides a warning to a user when accessory 800 is connected.

It will be appreciated that these examples are illustrative and that variations and modifications are possible. Any number of device models and device classes may be considered.

The test results bit mask for a given accessory can be populated in various ways. For example, the developer of an accessory can test the accessory with various MCD models as part of the accessory development cycle. Once the design and testing are finalized, the bit mask can be populated and stored into individual accessory devices as they are produced. In some instances, the bit mask can be included in accessory firmware and bit mask content can be updated to the same extent and through the same mechanisms as other accessory firmware updates. Thus, for example, an existing accessory can be tested with a new MCD model, and the accessory's firmware can be updated to reflect the test result. The waiver bit mask can be populated and managed similarly. In still other embodiments, an accessory (or MCD) can obtain test result data through other channels, e.g., via a real-time request sent to a test-result-data server over a wireless network.

While the examples in FIGS. 6-8 show the bits associated with devices in the same device class as occupying a contiguous portion of the bit mask, this is not required. For example, when a new MCD model is developed, a bit corresponding to that model can be added to the end of the bit mask, without regard to the device class assignment of the new model. Thus, referring to the examples in FIGS. 6-8, suppose that a new phone model E, belonging to device class 1, is introduced. A seventh bit can be added to the test results bitmask and assigned to phone model E, while existing models retain their original bit assignments. This also allows older accessories (which might not have been tested with newer models) to send bit masks containing fewer bits than the number of MCD models in existence at a given time. A newer MCD model can correctly interpret the shorter bit mask because the bit position assigned to a particular MCD model remains unchanged. As long as the MCD can identify which bits of the bit mask correspond to its own device class, the MCD can correctly determine compatibility of any accessory regardless of the length of the bit mask the accessory provides and regardless of whether the relevant bits (i.e., the bits associated with MCD models in the same class as a particular MCD) are arranged in a contiguous group.

Figure 9:
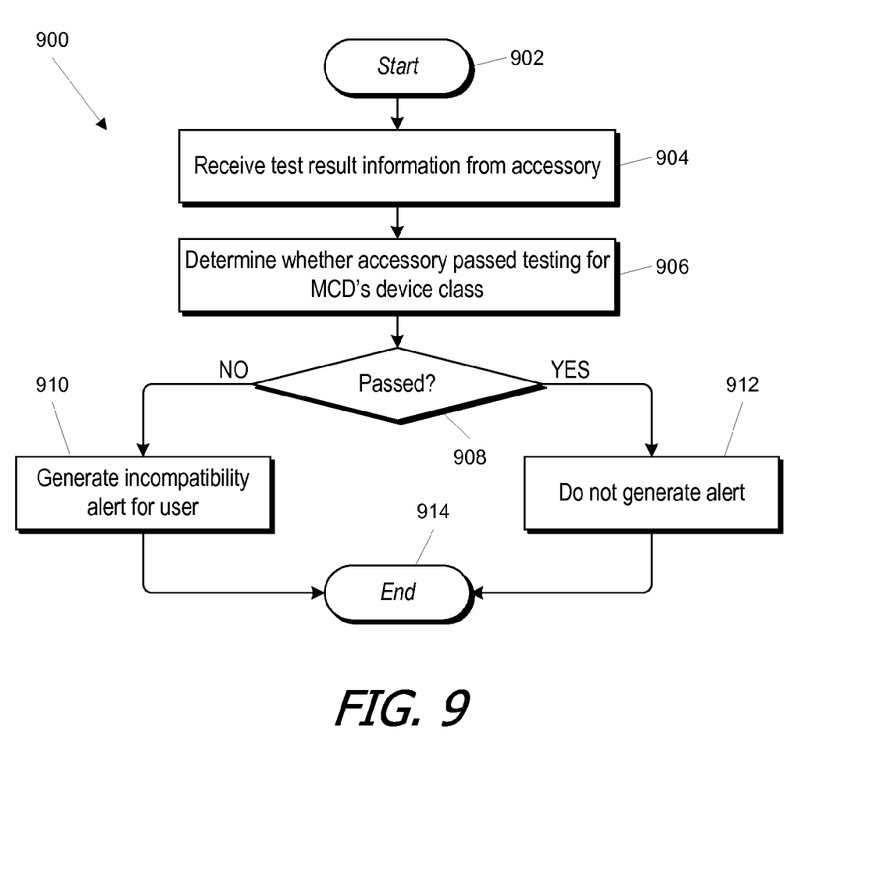
FIG. 9 is a flow diagram of a process that an MCD can use to determine compatibility of an accessory according to an embodiment of the present invention.

FIG. 9 is a flow diagram of a process 900 that an MCD (e.g., MCD 402 of FIG. 4) can use to determine compatibility of an accessory according to an embodiment of the present invention. Process 900 can be implemented, e.g., by processor 410 of MCD 402 of FIG. 4.

Process 900 starts (block 902) when an accessory (e.g., accessory 406 of FIG. 4) becomes connected to MCD 402. At block 904, MCD 402 receives test result information (e.g., test result bit mask 454 and waiver bit mask 456) from accessory 406. In some embodiments, block 904 can include using the RequestTestResults and SendTestResults commands of FIG. 5. In other embodiments, accessory 406 can send its test results without waiting for a request, e.g., as part of providing identification and configuration information to MCD 402.

In some embodiments, MCD 402 can obtain test result information for accessory 406 from a source other than accessory 406 itself. For example, MCD 402 can communicate via a wireless network (e.g., the Internet) with a server that maintains test result data for accessories; such a server can be controlled by the accessory manufacturer, the MCD manufacturer, or a third party. MCD 402 can request the test result information for a particular accessory, e.g., using accessory-identifying information obtained from accessory 406, and the server can provide the requested test result information. Where a server is used as a source for test result information, test results for an existing accessory can be updated (e.g., to reflect new MCD models) without providing new firmware to the accessory.

At block 906, MCD 402 can determine from the test result information whether the accessory passed compatibility testing for the MCD's device class. For example, referring to FIGS. 6-8, MCD 402 can be configured with device class information indicating which one or more bits of the test results bit mask correspond to MCD models in the same device class as MCD 402. (One of these bits can correspond to the actual model of MCD 402, but other MD models can also be associated with the same device class), and block 906 can include examining those bits. One example of a process for determining whether the accessory passed compatibility testing is described below with reference to FIG. 10.

If it is determined the accessory has not passed compatibility testing for the MCD's device class (decision block 908), MCD 402 can provide warning information to a user at block 910. For example, the alert screen illustrated in FIG. 2 can be used to notify the user that the accessory may interfere with or adversely affect certain MCD operations (e.g., RF communication). In another embodiment, the warning information can be incorporated into information about the accessory that is accessible to the user. Referring again to decision block 908, if the accessory has passed compatibility testing, no warning information is provided (block 912). In either case, process 900 can end (block 914). After completion of process 900, MCD 402 can continue to interoperate with accessory 406 regardless of whether accessory 406 was determined to have passed compatibility testing.

Figure 10:
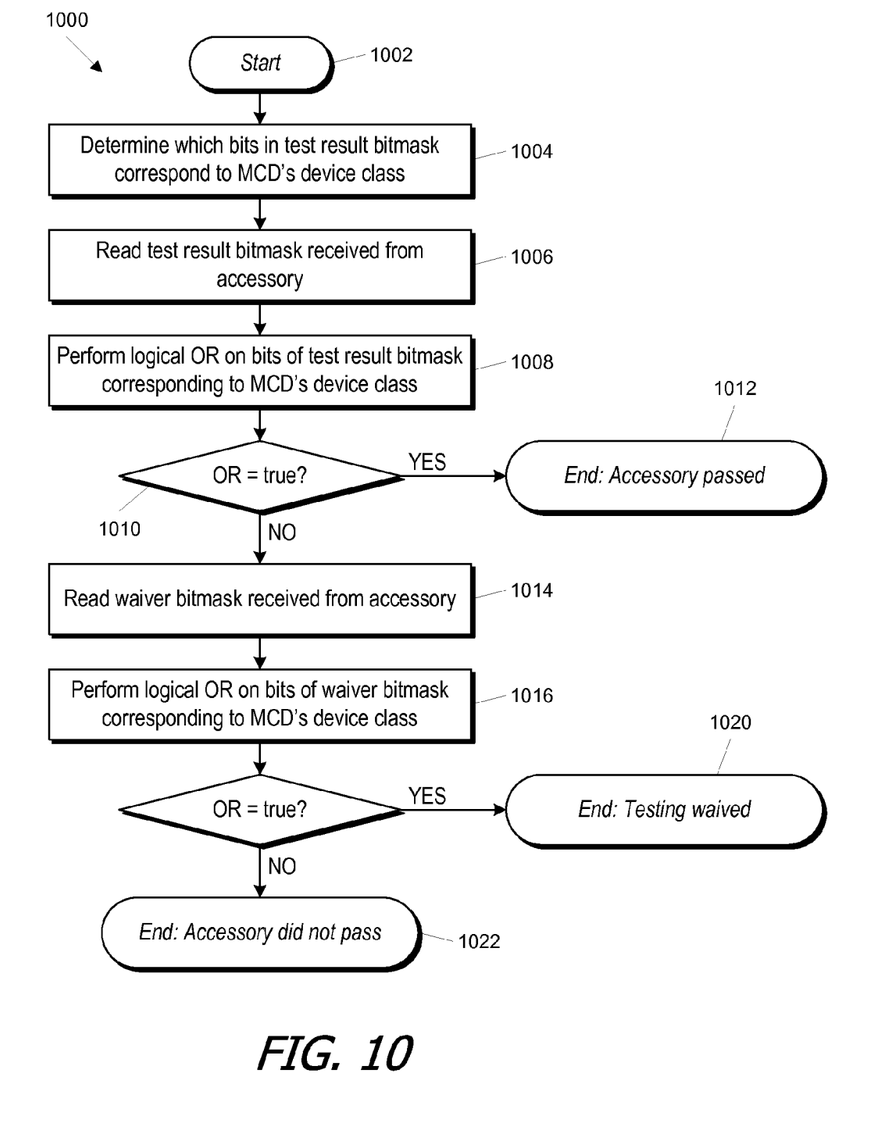
FIG. 10 is a flow diagram of a process for determining whether an accessory has passed compatibility testing for an MCD's device class according to an embodiment of the present invention.

FIG. 10 is a flow diagram of a process 1000 for determining whether an accessory has passed compatibility testing for an MCD's device class according to an embodiment of the present invention. Process 1000 can be implemented, e.g., at block 906 of process 900 described above.

Process 1000 can start (block 1002) at any time after the MCD (e.g., MCD 402 of FIG. 4) receives the test result information, e.g., a test result bit mask and waiver bit mask as described above, from an accessory (e.g., accessory 406 of FIG. 4). At block 1004, MCD 402 can determine which bits in the test result bit mask correspond to the MCD's device class. For example, device class information 413 in storage device 412 (FIG. 4) can include a list of bit identifiers corresponding to the MCD's device class. This list can be provided as part of the MCD's firmware and can be updated when the MCD's firmware is updated. Thus, if a new MCD model is introduced that belongs to the same device class as an older MCD model, the older model can be made aware of the new model's presence in the device class via a firmware update.

At block 1006, MCD 402 can read the relevant bits (i.e., the bits corresponding to the MCD's device class) from the received test result bit mask. At block 1008, MCD 402 can perform a logical OR on the relevant bits of the test result bit mask. If, at decision block 1010, the logical OR result is "true," then process 1000 ends at block 1012 with the determination that the accessory has passed the compatibility testing. If not, process 1000 proceeds to consider waiver information.

More specifically, at block 1014, MCD 402 can read the relevant bits from the waiver bitmask received from the accessory. At block 1016, MCD 402 can perform a logical OR on the relevant bits of the waiver bit mask. If, at decision block 1018, the logical OR result is "true," then process 1000 ends at block 1020 with the determination that testing was waived for the MCD's device class. Otherwise, process 1000 ends at block 1022 with the determination that the accessory did not pass the compatibility test.

The determination resulting from process 1000 can be used at decision block 908 of process 900 of FIG. 9. In some embodiments, for purposes of determining whether to provide incompatibility warning information, a "testing waived" result (block 1020) is treated as the same as a "pass" result. Nevertheless, it can be useful for MCD 402 to distinguish between an accessory that passed compatibility testing and an accessory for which the testing was waived. For example, during diagnostics or troubleshooting, the distinction may make a difference: if the accessory passed compatibility testing, accessory interference is unlikely to be the cause of a problem, whereas if testing was waived, accessory interference may be considered a more likely cause.

Figure 11:
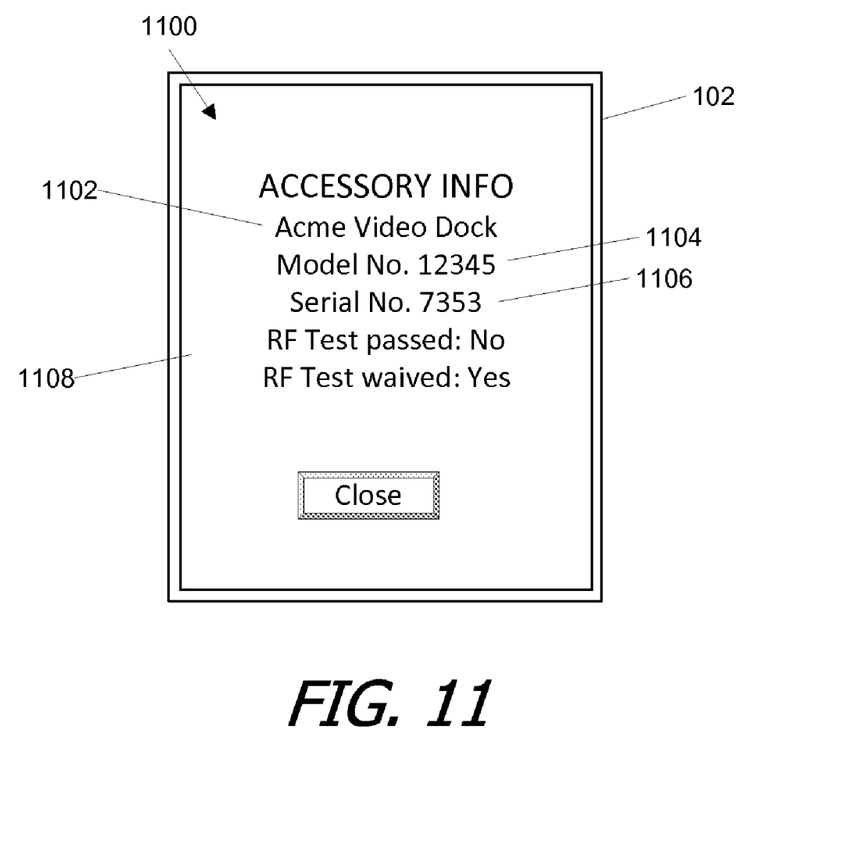
FIG. 11 illustrates an accessory information screen that can be displayed on an MCD's display screen according to an embodiment of the present invention.

In some embodiments, a user operating an MCD can determine whether testing was passed or waived for a given accessory. FIG. 11 illustrates an accessory information screen 1100 that can be displayed on an MCD's display (e.g., display 102 of MCD 100 in FIG. 1) according to an embodiment of the present invention. Screen 1100 can be accessed by a user via the user interface of the MCD, e.g., within a "Settings" menu or the like. In some embodiments, screen 1100 is accessible for a currently connected accessory. In other embodiments the MCD can store information about previously connected accessories, and a user can access that information even after an accessory disconnects.

Screen 1100 can provide various information about an accessory, such as name 1102, model number 1104, serial number 1106, and test result information 1108. In the example shown, the test result information indicates that RF interference testing was waived but not passed for this accessory with regard to the MCD's device class. In some embodiments, visual highlighting (e.g., font, font color and/or background, warning icons, or the like) can be used to attract the user's attention to test result information 1108 in the event that testing was not passed and/or in the event that testing was waived. In some embodiments, additional information may be available. For example, screen 1100 can list all device classes or specific MCD models for which the accessory passed the test and all device classes or specific MCD models for which testing was waived. Test result information can be used for diagnostics, troubleshooting, or other purposes; further, this information (or any other user-accessible indication related to test results) can be regarded as a form of warning information that an MCD can provide to a user.

Embodiments described herein allow an MCD to receive detailed information regarding the testing of an accessory on a per-model or per-device-class basis. A particular MCD can use this information to assess the likelihood that an accessory will interfere with or adversely affect its operation and can decide whether to provide warning information to the user. Use of per-model warnings can reduce the number of false warnings (i.e., warnings where there is no elevated risk) as well as false negatives (i.e., where no warning is generated even when the risk is elevated). Certain techniques described herein are also robust against introduction of new MCD models, providing enhanced compatibility between older accessories and newer MCDs.

While the invention has been described with respect to specific embodiments, one skilled in the art will recognize that numerous modifications are possible. For example, while RF interference is used as an example of a compatibility issue that can be detected in testing and for which user alerts or other warnings may be desirable, the invention is not limited to RF interference. Any type of accessory interference with or adverse effect on MCD operation can be tested, and test results for a particular accessory can be reported to an MCD in the manner described. Multiple types of testing can be done and reported (e.g., using separate bitmasks for each test type), and the device class groupings may be different for different types of testing.

An MCD can use the test result information to generate warnings of a potential compatibility issue, report accessory properties, or take other action. For example, the MCD can automatically disable a function that is potentially incompatible with the accessory while the accessory is connected, change internal settings to reduce the likelihood of interference (e.g., communicating at a different frequency or using a different protocol), or the like.

As used herein the term "compatible" (or "compatibility") refers generally to an accessory that is expected, on the basis of testing, not to interfere with or adversely affect other operations of an MCD. Compatibility is established by passing an appropriate test, the standard for which can be set by the MCD manufacturer in the interest of uniformity across accessories. Accessories that have not passed such a test may be referred to as "incompatible," with the understanding that an accessory labeled "incompatible" may in fact be interoperable with a particular MCD and might or might not actually interfere with or adversely affect other MCD operations.

The use of bit masks to indicate test results and/or waiver is optional; in various embodiments, test results can be provided from an accessory to an MCD in different formats. For example, the accessory may provide a list of MCD model identifiers for which the accessory passed compatibility testing. The accessory can also provide more details about the type(s) of testing that were conducted and what the results were (e.g., an actual test score rather than a pass/fail indication).

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. A method for use in a mobile computing device communicably coupled with an accessory, wherein the mobile computing device is associated with a target device class, the target device class being one of a plurality of predefined device classes, the method comprising:

receiving, by the mobile computing device, test result information about the accessory, the test result information indicating a test result for each of a plurality of device models, wherein different ones of the device models are associated with different ones of the predefined device classes, and wherein at least one of the predefined device classes has more than one of the device models associated therewith;

determining, by the mobile computing device, whether the accessory is deemed to be compatible with the mobile computing device, wherein the determination is based at least in part on whether the received test result information indicates a pass result for at least one of the device models associated with the target device class; and generating, by the mobile computing device, a warning in the event that the accessory is not deemed to be compatible with the mobile computing device.

2. The method of claim 1 further comprising:

receiving, by the mobile computing device, waiver information from the accessory, the waiver information indicating whether testing was waived for one or more of the predefined device classes, and wherein the determination whether the accessory is deemed to be compatible with the mobile computing device is based in part on whether testing was waived for at least one of the device models associated with the target device class.

3. The method of claim 1 wherein receiving the test result information includes receiving a bit mask wherein each bit corresponds to a different device model and wherein determining whether the accessory is deemed to be compatible with the mobile computing device includes accessing bits from the bit mask that correspond to device models in the target device class.

4. The method of claim 1 further comprising:

displaying, by the mobile computing device, an accessory information screen for the user, the accessory information screen including at least a portion of the test result information.

5. The method of claim 1 wherein the test result information reflects a result of a radio-frequency interference test.

6. The method of claim 1 wherein generating the warning includes displaying a pop-up message on a display of the mobile computing device.

7. The method of claim 1 wherein generating the warning includes providing warning information in an accessory information screen displayable on the mobile communication device, the warning information indicating that the accessory is not deemed to be compatible with the mobile computing device.

8. A computer readable storage medium encoded with program instructions that, when executed, cause a processor in a target mobile computing device to execute a method, the method comprising:

receiving a test result bitmask from an accessory, the test result bitmask consisting of a plurality of bits, each bit being associated with a different one of a plurality of mobile computing device models, each bit indicating whether the accessory passed a compatibility test with the associated mobile computing device model;

selecting one or more bits from the test result bitmask, wherein each of the selected one or more bits is associated with a mobile computing device model belonging to a same device class as the target mobile computing device;

determining, based at least in part on the selected one or more bits, whether the accessory passed the compatibility test with at least one mobile computing device model belonging to the same device class as the target mobile computing device; and generating a warning in the event that the accessory did not pass the compatibility test with any mobile computing device model belonging to the same device class as the target mobile computing device.

9. The computer readable storage medium of claim 8 wherein the method further comprises:

receiving a waiver bitmask from the accessory, the waiver bitmask consisting of a plurality of bits, each bit being associated with a different one of the plurality of mobile computing device models, each bit indicating whether the compatibility test was waived for the accessory with respect to the associated mobile computing device model, and wherein the determination as to whether the accessory passed the compatibility test with at least one mobile computing device model belonging to the same device class as the target mobile computing device is based in part on the waiver bitmask.

10. The computer readable storage medium of claim 8 wherein generating the alert includes prompting the user to disable a feature of the mobile computing device.

11. The computer readable storage medium of claim 8 wherein the plurality of device models includes at least one mobile phone model and at least one tablet computer model.

12. A mobile computing device comprising:

a processor;

an accessory interface communicably coupled to the processor and configured to communicate with an accessory; and a storage device configured to store data including one or more mobile computing device model identifiers associated with a target device class, wherein the processor is configured to:

receive a test result bitmask about the accessory, the test result bitmask consisting of a plurality of bits, each bit being associated with a different one of a plurality of mobile computing device models, each bit indicating whether the accessory passed a compatibility test with the associated mobile computing device model;

receive a waiver bitmask about the accessory, the waiver bitmask consisting of a plurality of bits, each bit being associated with a different one of the plurality of mobile computing device models, each bit indicating whether the compatibility test was waived for the accessory with respect to the associated mobile computing device model;

determine, based on the test result bitmask, whether the accessory passed the compatibility test with at least one mobile computing device model belonging to the same device class as the target mobile computing device;

determine, in the event that the accessory did not pass the compatibility test with any mobile computing device model belonging to the same device class as the target mobile computing device, whether the waiver bitmask indicates that the compatibility test was waived for the accessory with respect to at least one mobile computing device model belonging to the same device class as the target mobile computing device; and generate a warning in the event that the accessory did not pass the compatibility test with any mobile computing device model belonging to the same device class as the target mobile computing device and the compatibility test was not waived with respect to at least one mobile computing device model belonging to the same device class as the target mobile computing device.

13. The mobile computing device of claim 12 further comprising:
a display screen,
wherein the processor is further configured such that generating the alert includes displaying an alert message on the display screen.

14. The mobile computing device of claim 12 wherein the plurality of mobile computing device models include at least one smart phone model and at least one tablet computer model.

15. The mobile computing device of claim 12 further comprising:
a radio frequency transceiver configured to communicate with at least one of a voice network or a data network, and
wherein the test result information reflects a result of a radio-frequency interference test.

16. The mobile computing device of claim 15 wherein the processor is further configured such that generating the alert includes prompting the user to disable the radio frequency transceiver.

17. The mobile computing device of claim 12 wherein the processor is further configured to receive the test result bitmask and the waiver bitmask from the accessory via the accessory interface.

18. The mobile computing device of claim 12 further comprising:
a network interface communicably coupled to the processor,
wherein the processor is further configured to request the test result bitmask and the waiver bitmask from a server via the network interface and to receive the test result bitmask and the waiver bitmask from the server via the network interface.

19. An accessory for use with a plurality of mobile computing devices, the accessory comprising: a storage medium configured to store information including test result information, the test result information indicating a pass or non-pass result of a compatibility test for each of a plurality of mobile computing device models; an interface configured to communicate with a mobile computing device; and a controller coupled to the storage medium and the interface, the controller being configured to provide the test result information from the storage medium to the mobile computing device via the interface, wherein the storage medium is further configured to store waiver information, the waiver information indicating whether the compatibility test was waived for the accessory with respect to any of the plurality of mobile computing device models, and wherein the controller is further configured to provide the waiver information from the storage medium to the portable computing device via the interface.

20. The accessory of claim 19 wherein the controller is further configured to provide the test result information in response to a request from the mobile computing device.

21. The accessory of claim 19 wherein the controller is further configured to provide the test result information automatically in response to becoming connected to the mobile computing device.

22. The accessory of claim 19 wherein the controller is further configured to receive an update to the test result information via the interface and to replace the stored test result information in the storage medium with the updated test result information.

23. The accessory of claim 19 wherein the compatibility test includes a radio-frequency interference test.

* * * * *